United States Patent
Counts et al.

(10) Patent No.: US 7,437,573 B2
(45) Date of Patent: Oct. 14, 2008

(54) SECURE UNSENT MESSAGE STORAGE PENDING SERVER CONNECTION

(75) Inventors: Eian D. Counts, Seoul (KR); Garrett R. Vargas, Sammamish, WA (US); Hsuan-Yu Jerry Lin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 309 days.

(21) Appl. No.: 11/144,379

(22) Filed: Jun. 3, 2005

(65) Prior Publication Data

US 2006/0277416 A1 Dec. 7, 2006

(51) Int. Cl.
*H04L 9/00* (2006.01)
(52) U.S. Cl. .................................... 713/193; 380/270
(58) Field of Classification Search .............. 713/150, 713/189, 193; 380/255; 709/227, 228; 726/1, 726/2
See application file for complete search history.

(56) References Cited

U.S. PATENT DOCUMENTS 5,751,813 A * 5/1998 Dorenbos .................. 713/153
7,210,044 B2 * 4/2007 Lai et al. .................... 713/193
2006/0052142 A1 * 3/2006 Herz et al. ............... 455/569.2

OTHER PUBLICATIONS

Alfred J. Menezes et al., Hand books of Applied Cryptography, CRC Press, 494,544,656,661.*
Scott Mueller, Upgrading and Repairing PCs, Que, 570.*

* cited by examiner

*Primary Examiner*—Gilberto Barron, Jr.
*Assistant Examiner*—Shahrouz Yousefi
(74) *Attorney, Agent, or Firm*—Merchant & Gould; Timothy P. Sullivan

(57) ABSTRACT

Unsent messages are securely stored in a client by determining whether a connection to a server exists. If the connection exists, the message can be sent using the intended recipient's public key. In response to a determination that a connection from the client to a server does not exist, information from the client can be used to encrypt a modulated data signal that is to be sent from the client to the server. The encrypted modulated data signal is stored on the client. When a determination is made that a connection from the client to the server exists, information from the client is used to decrypt the encrypted modulated data signal.

20 Claims, 4 Drawing Sheets

SECURE UNSENT MESSAGE STORAGE PENDING SERVER CONNECTION

BACKGROUND

Portable communication and/or computing devices ("embedded devices") can often be linked to various networks. For example, both cell phones and notepad computers can be used to browse web sites offered through the Internet and to send text, graphics, audio, and other types of messages. The messages are typically queued and then sent if and when a link is present.

Often, it is desired to send the communications securely through a communication link. However, for devices that are not always connected to a network, the devices might not have the encryption benefit of encryption services offered by the network, and the message may remain queued insecurely on the device.

For example, when a message to be encrypted is composed, the contents of the message are typically stored in system memory. When the user chooses to save the message to the Drafts folder or send the message, the message is written to and stored in the system database until a network connection can be established and the recipients' public keys can be retrieved to properly encrypt and send the message. Because the system database is open to any application to read or modify, the contents can be subject to a malicious application that might intercept and alter the contents unbeknownst to the sender

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Unsent messages are securely stored in a client by determining whether a connection to a server exists. If the connection exists, the message can be sent using the intended recipient's public key. In response to a determination that a connection from the client to a server does not exist, information from the client can be used to encrypt a modulated data signal that is to be sent from the client to the server. The encrypted modulated data signal is stored on the client. When a determination is made that a connection from the client to the server exists, information from the client is used to decrypt the encrypted modulated data signal. The decrypted modulated data signal can then be sent using the intended recipient's public key

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF ILLUSTRATED EMBODIMENTS

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

ILLUSTRATIVE EMBODIMENTS

Figure 1:
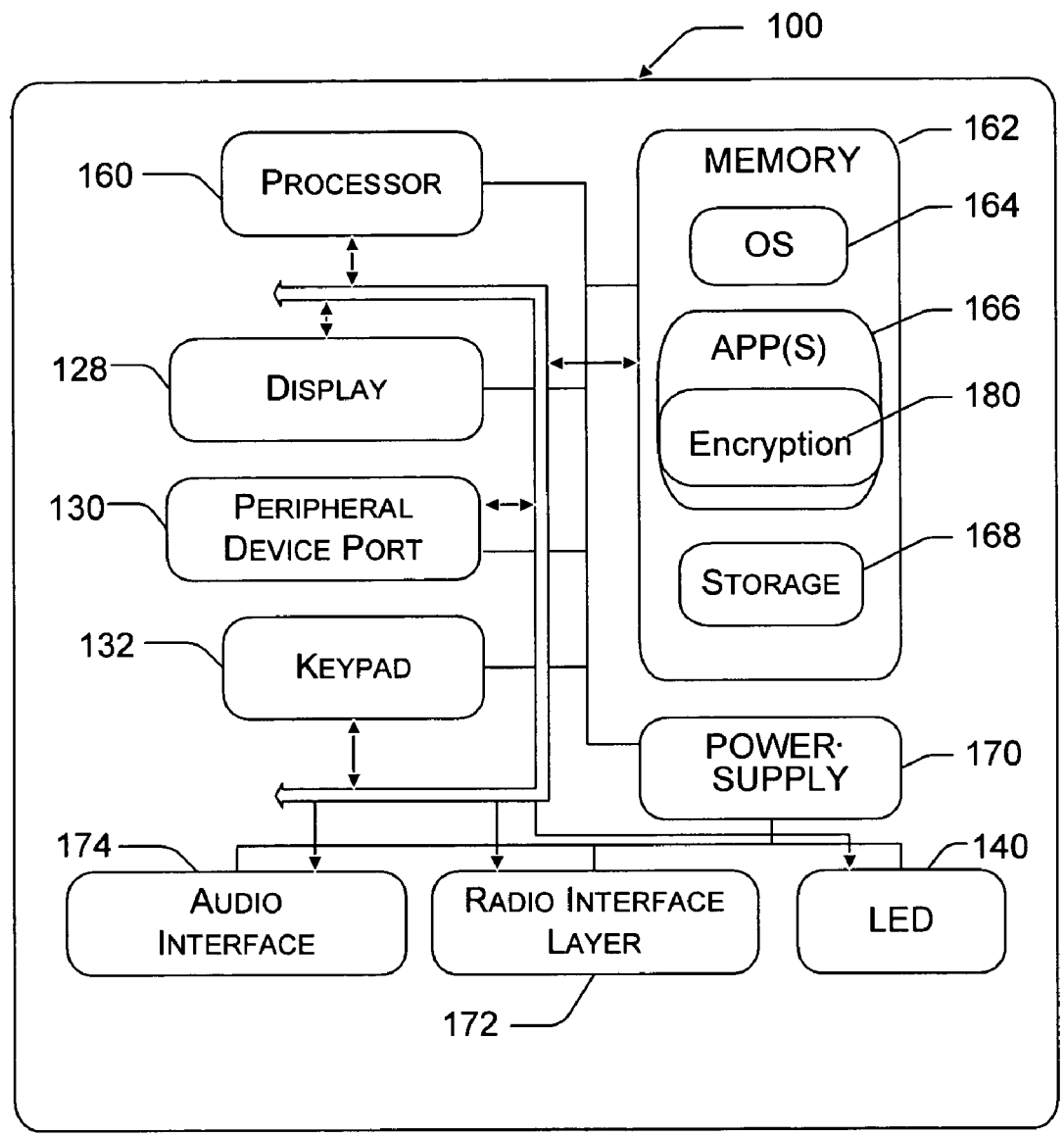
FIG. 1 is a block diagram illustrating an exemplary embedded device that may be used according to an exemplary embodiment of the present invention.

FIG. 1 is a block diagram illustrating an exemplary embedded device that may be used according to an exemplary embodiment of the present invention. For example, embedded device 100 can be a "smart phone" that can run one or more applications similar to those of a desktop or notebook computer such as, for example, browser, email, scheduling, instant messaging, and media player applications. Embedded device 100 typically executes an OS such as Windows Mobile 2003 or Windows CE. In some embodiments, embedded device 100 is integrated as a computing device, such as an integrated personal digital assistant (PDA) and wireless phone.

In an embodiment, embedded device 100 has a processor 160, a memory 162, a display 128, and a keypad 132. Memory 162 generally includes both volatile memory (e.g., RAM) and non-volatile memory (e.g., ROM, Flash Memory, or the like). Embedded device 100 includes an operating system 164, which can be resident in a flash memory portion of memory 162 for execution on processor 160. Keypad 132 may be a push button numeric dialing pad (such as on a typical telephone), a multi-key keyboard (such as a conventional keyboard), or may not be included in the embedded device in deference to a touch screen, stylus, or voice activation. Display 128 may be a liquid crystal display, or any other type of display commonly used in mobile computing devices. Display 128 may be touch-sensitive, which could then also act as an input device.

One or more application programs 166 are loaded into memory 162 and run on operating system 164. Examples of application programs include phone dialer programs, e-mail programs, scheduling programs, PIM (personal information management) programs, word processing programs, spreadsheet programs, Internet browser programs, and so forth. In one embodiment, application programs 166 include encryption services 180. Embedded device 100 also includes non-volatile storage 168 within the memory 162. Non-volatile storage 168 may be used to store persistent information that should not be lost if embedded device 100 is powered down. The applications 166 may use and store information in storage 168, such as e-mail or other messages used by an e-mail application, contact information used by a PIM, appointment information used by a scheduling program, documents used by a word processing application, and the like. A synchronization application (not shown) may also reside on the embedded device and can be programmed to interact with a corresponding synchronization application resident on a host computer to keep the information stored in the storage 168 synchronized with corresponding information stored at the host computer. In some embodiments, storage 168 includes the aforementioned flash memory in which the OS (and possibly other software) is stored.

Embedded device 100 has a power supply 170, which may be implemented using one or more batteries. Power supply 170 could further include an external power source, such as an AC adapter or a powered docking cradle that supplements and/or recharges the batteries.

Embedded device 100 is also shown as having two other types of external notification mechanisms: an LED 140 and an audio interface 174. These devices may be directly coupled to power supply 170 so that when activated, they remain on for a duration dictated by the notification mechanism even though processor 160 and other components might shut down to conserve battery power. LED 140 may be programmed to remain on indefinitely until the user takes action to indicate the powered-on status of the device. Audio interface 174 is used to provide audible signals to and receive audible signals from the user. For example, audio interface 174 may be coupled to a speaker for providing audible output and to a microphone for receiving audible input, such as to facilitate a telephone conversation.

Embedded device 100 also includes a radio 172 that performs the function of transmitting and receiving radio frequency communications. Radio 172 facilitates wireless connectivity between the embedded device 100 and the outside world, via a communications carrier or service provider. Transmissions to and from the radio 172 are conducted under control of the operating system 164. In other words, communications received by the radio 172 may be disseminated to application programs 166 via the operating system 164, and vice versa.

The radio 172 allows the embedded device 100 to communicate with other computing devices, such as over a network. The radio interface layer 172 is one example of communication media. Communication media may typically be embodied by computer readable instructions, data structures, program modules, or other data in a modulated data signal, such as a carrier wave or other transport mechanism, and includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
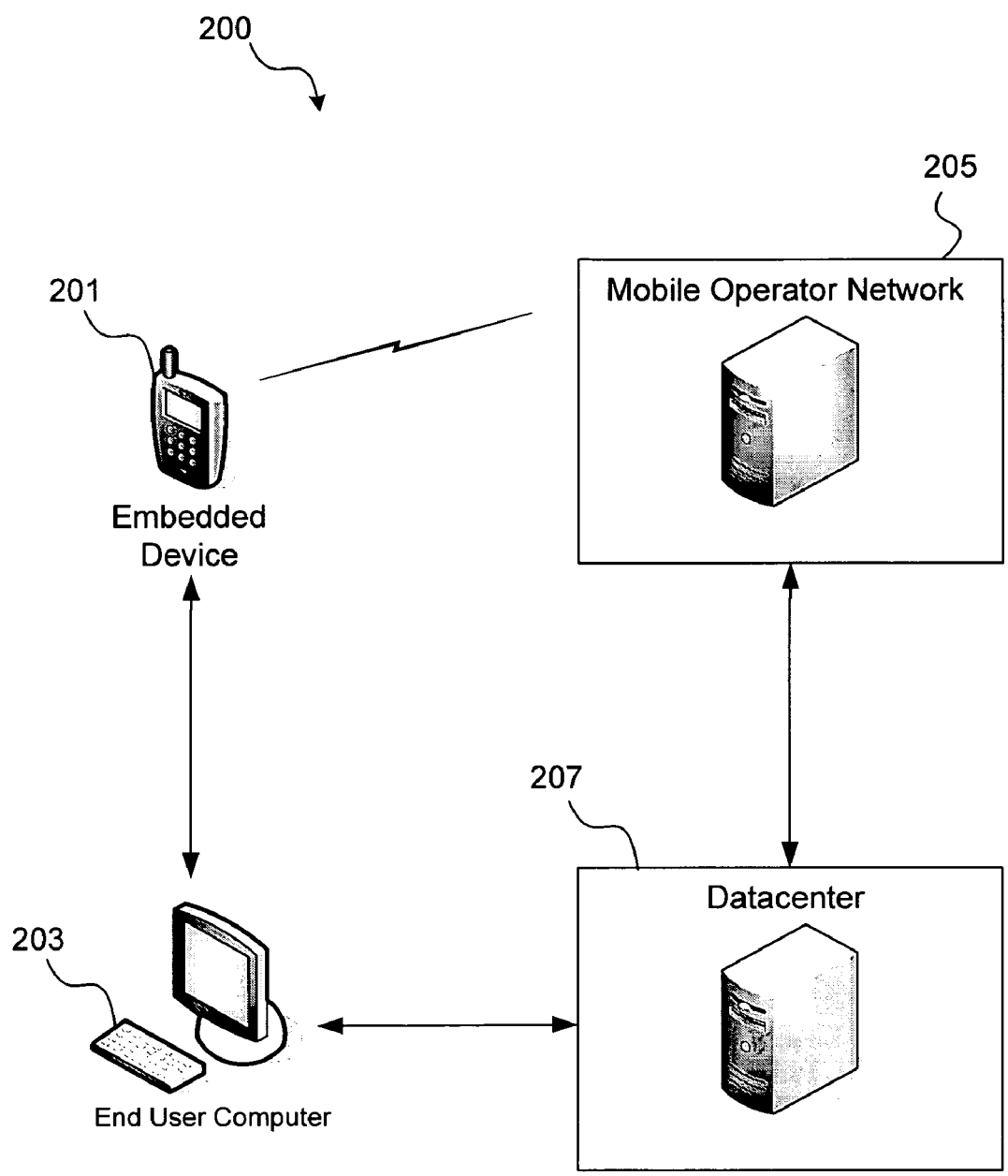
FIG. 2 illustrates a system 200 for providing secure communications to an embedded device, according to an exemplary embodiment of the present invention.

FIG. 2 illustrates a system 200 for providing secure communications to an embedded device, according to an exemplary embodiment of the present invention. In this embodiment, system 200 includes an embedded device 201, an end-user computer 203 (optional), a mobile operator network 205 and a data center 207.

In one embodiment, embedded device 201 is implemented as described above for embedded device 100 (FIG. 1).

End user computer 203 can be implemented using any suitable computer that can communicate with embedded device 201 via a link such as a USB interface, an IR interface, serial port, etc. to allow synchronization of data between end user computer 203 and embedded device 201. This synchronization data is typically persistent data used by applications such as email, media players, calendars, spreadsheets, text documents, etc. and is different from the updates for the OS of the embedded device. In addition, end user computer 203 can communicate with data center 207 via a network (e.g., the Internet).

Mobile operator network 205 is an entity that provides wireless communication services to be accessed using embedded device 201. For example, mobile operator network 205 can be provided and operated by a cellular telephone service provider such as, for example, Cingular, Verizon, Sprint or other mobile telephone operators that exist in many countries throughout the world. Mobile operator network 205 in this illustrated embodiment supports wireless data services such as SMS and GPRS as well as mobile telephone (voice) service to embedded devices. Mobile operator network 205 can also communicate via other networks (wired or wireless) such as, for example, the Internet. In some embodiments, mobile operator network 205 can communicate with data center 207 via the Internet.

Data center 207, in this embodiment, is a network that provides storage and access to data used by embedded devices and mobile operator networks for content, applications and application updates, etc. For example, data center 207 can store and provide access to ring tones, email settings, UI themes, applications updates and new applications for use in embedded devices via a network interface (e.g., an Internet connection).

In accordance with this embodiment of the invention, datacenter 207 can also store and provide access to information to update the operating systems of embedded devices. For example, OS update information can be uploaded and stored in datacenter 207 by the OS vendor via an Internet connection.

Datacenter 207 can then send embedded device 201 a message (e.g., a text message) that includes an address (e.g., a URL) of where updated OS information can be accessed. Datacenter 207 may send this message either after a request from embedded device 201 received via a wireless message or from the network connection via end user computer 203, or in response to a wireless message sent by datacenter 207 via mobile operator network 205. Embedded device 201 can then download the OS update information (e.g., an image of the updated OS or updated portion(s) of the OS) from datacenter 207 either wirelessly (e.g., a GPRS connection) or from the network connection via end user computer 203.

Secure Storage Mechanism

Tools for sending messages on embedded devices (or other devices that are subject to unavailability of communication links) often rely upon an S/MIME communications layer to ensure secure communications. However, conventional S/MIME implementations do not ensure that mail can be securely stored locally. For example, messages that are unsent are typically stored locally on a hard disk. Conventional S/MIME implementations cannot ensure that the unsent messages stored on the hard disk cannot be tampered with before the messages are encrypted and sent.

When using, for example, a mail tool on a desktop computer (which is typically an "always-connected" platform), security of the messages is not usually a problem because the recipients' public keys can be immediately retrieved (using the communication connection) and messages can be encrypted before the messages are saved on the disk for the first time.

However, on a non-connected embedded device, it is not always possible to retrieve the recipients' public keys before the occasion arises to save the message to the Outbox or Drafts folder. By using encryption, such as provided by the DPAPI (discussed below), the message can be securely stored. DPAPI can use an entropy value to encrypt the message, which ensures untrusted applications cannot decipher the message while the message is stored locally on the device.

Figure 3:
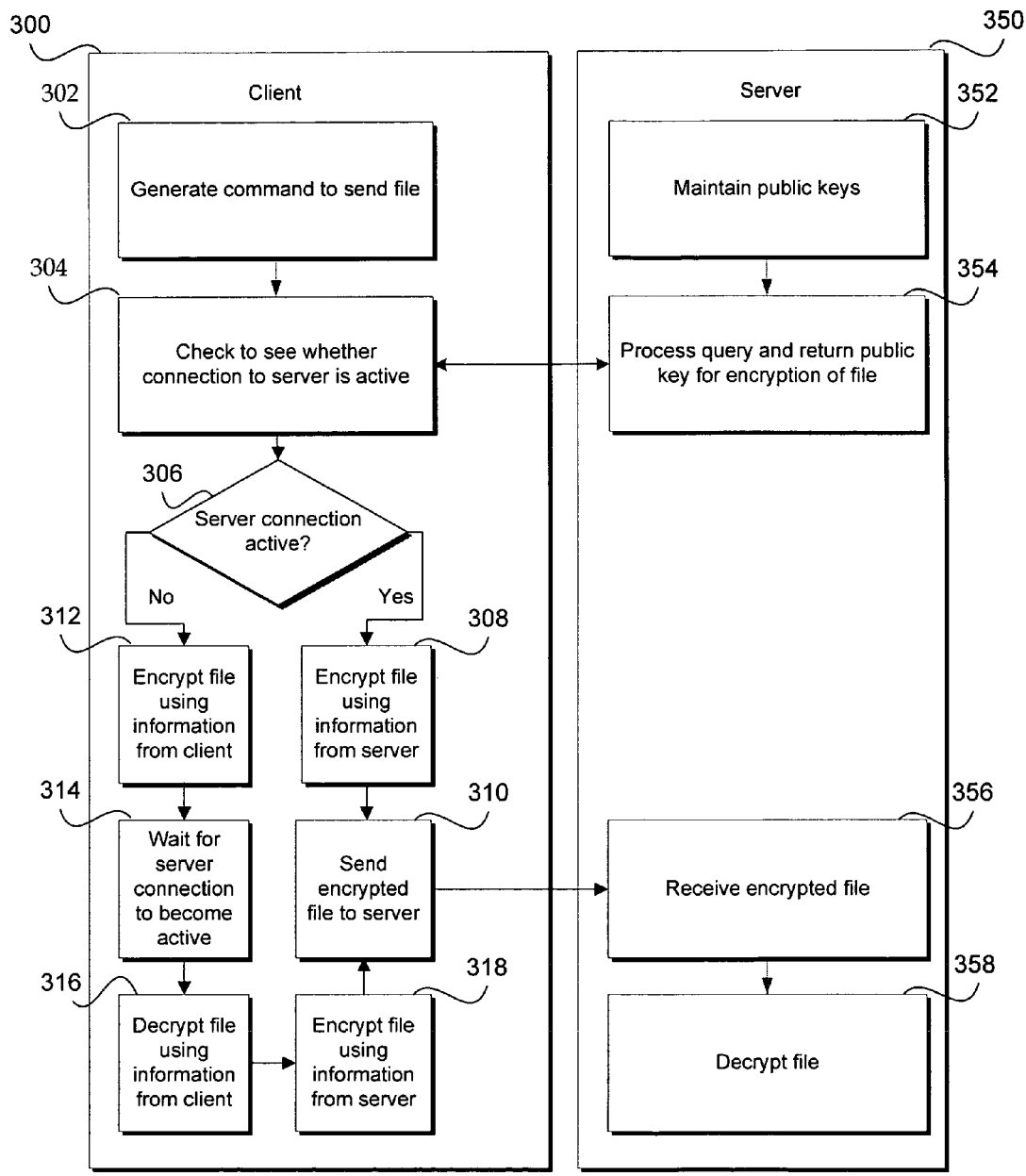
FIG. 3 is a block diagram illustrating secure local storage for unsent messages in accordance with aspects of the present invention.

FIG. 3 is a block diagram illustrating secure local storage for unsent messages in accordance with aspects of the present invention. Client 300 is, for example, an embedded device that may have an active or an inactive connection to server 350. Server 350 may act, for example, as a server for a mail tool that resides on client 300. In block 352, server 350 maintains public keys for intended recipients of e-mail (and the like) messages. In block 354, the public keys are provided in accordance with request from client 300.

In block 302, the user of the device comprising client 300 generates a command to, for example, send a file (and the like) to server 350. The user might generate the command by, for example, selecting a send button for an e-mail message on a mail tool.

In block 304, client 300 determines whether there is an active connection to server 350. For example, the determination may be made to in response to the command generated in block 302 or may be determined by polling server 350 periodically to determine whether a connection is active. Client 300 may also obtain the public keys during the polling process, or perhaps obtain the public keys in response to the command generated in block 302.

If the connection is active in block 306, the process proceeds to block 308 where the client uses, for example, the public key of the intended recipient of the e-mail message to be sent to encrypt the e-mail message. In block 310, the encrypted e-mail message is sent to server 350 using the existing network connection.

In block 356, server 350 receives the encrypted file. In block 358, the encrypted file may be provided to the intended recipient where the received file can be decrypted using, for example, the intended recipient's private key.

If the connection is not active in block 306, the process proceeds to block 312 where the file is encrypted using information provided by client 300. The file may be encrypted using Data Protection Application Programmer's Interface (DPAPI), which is typically provided by the Windows® operating system. The public DPAPI interfaces are part of crypt32.dll and are available for any user process that invokes the DLL.

Applications can pass plaintext data to the DPAPI and receive an opaque protected data blob in response. (Subsequently, the applications can pass the protected data block to the DPAPI to allow the plaintext to be reconstructed.) When an application calls one of the DPAPI functions, a local RPC call is made to the Local Security Authority (LSA), wherein private calls are made to DPAPI private functions. The private functions call to a CryptoAPI, via the crypt32.dll, for the actual encryption (or decryption) of the data in the security context of the LSA. (Running the functions in the security context of the LSA allows security audits to be generated, for example.) The DPAPI typically generates a strong key using a standard cryptographic process (called a password-based key derivation) to generate the strong key from the user's credentials (such as a password). The strong key can be encrypted using triple-DES and stored in the user's profile directory. The strong key is typically used to generate a (for example, symmetric) session key, which may be further strengthened by using random data and any desired additional entropy to generate the session key. The session key is typically used to encrypt (or decrypt) the file that is to be stored securely until a connection to server 350 can be established. (The session key in various embodiments may also be an asymmetric key pair, in which one key is used to encrypt data and the other key is used to decrypt data.)

Before storing the message locally, the message can be converted into MIME format. A MIME stream is formed that is encrypted using the session key that is saved locally. Sensitive information in the message (such as the body contents) that would typically be encrypted using an intended recipient's public key are converted to a protected data blob, which protects the sensitive information against disclosure and/or modification. In an embodiment, sensitive properties are removed from the message so that they cannot be accessed programmatically after the MIME message has been generated and encrypted into a blob. These fields are then accessible via the encrypted MIME blob.

In block 314, the process waits for a connection to server 350 to become active. When a connection to server 350 becomes active, in block 316 the process retrieves the encrypted protected data blob using the session key. The protected data blob can be decrypted securely because typically the same application encrypts and decrypts the data. In an embodiment, it is a requirement that the same application encrypt and decrypt, or (at least) that the encrypting and decrypting applications share and use an a priori session key. This ensures a random third-party application cannot access this information.

For example, the inbox of the mail tool can invoke the DPAPI when no connection is present to encrypt an e-mail message, and likewise the inbox of the mail tool can invoke the DPAPI to decrypted the e-mail message when a connection to server 350 is established.

In block 318 (similarly to block 308), the client uses the public key of the intended recipient of the e-mail message to be sent to encrypt the e-mail message. In block 310, the encrypted e-mail message is sent to server 350 using the existing network connection. In block 356, server 350 receives the encrypted file. In block 358, the encrypted file may be provided to the intended recipient where the received file can be decrypted using, for example, the intended recipient's private key.

In an alternate scenario, the user may further modify the file after the file is decrypted in block 316. The modified file can be re-encrypted using session keys, or sent to the intended recipient via block 310.

Illustrative Operating Environment

Figure 4:
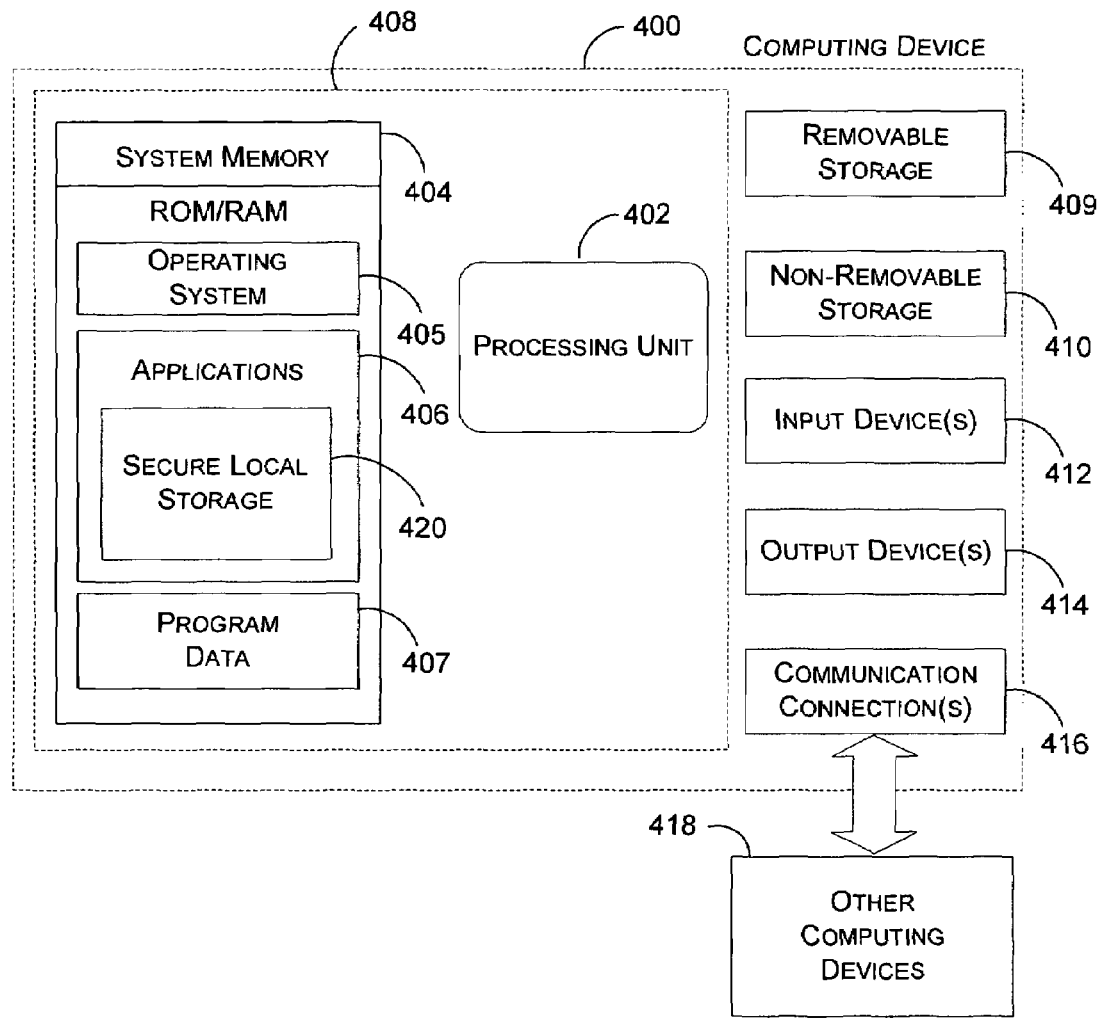
FIG. 4 illustrates an exemplary computing environment that may be used according to exemplary embodiments of the present invention.

With reference to FIG. 4, one exemplary system for implementing the invention includes a computing device, such as computing device 400. Computing device 400 may be configured as a client, a server, mobile device, or any other computing device. In a very basic configuration, computing device 400 typically includes at least one processing unit 402 and system memory 404. Depending on the exact configuration and type of computing device, system memory 404 may be volatile (such as RAM), non-volatile (such as ROM, flash memory, etc.) or some combination of the two. System memory 404 typically includes an operating system 405, one or more applications 406, and may include program data 407. In one embodiment, application 406 includes an application 420 for secure local storage. This basic configuration is illustrated in FIG. 4 by those components within dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by removable storage 409 and non-removable storage 410. Computer storage media may include volatile and nonvolatile, removable and non-removable media implemented in any method or technology for storage of information, such as computer readable instructions, data structures, program modules, or other data. System memory 404, removable storage 409 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of device 400. Computing device 400 may also have input device(s) 412 such as keyboard, mouse, pen, voice input device, touch input device, etc. Output device(s) 414 such as a display, speakers, printer, etc. may also be included.

Computing device 400 also contains communication connections 416 that allow the device to communicate with other computing devices 418, such as over a network. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for securely storing unsent messages in a client, the method comprising:
   in response to a determination that a connection from the client to a server does not exist:
      using information from the client to encrypt a modulated data signal that is to be sent from the client to the server; and
      storing the encrypted modulated data signal on the client; and
   in response to a determination that a connection from the client to the server exists:
      using information from the client to decrypt the encrypted modulated data signal into a decrypted modulated data signal; and
      encrypting the decrypted modulated data signal using information from the server for transmission to the server.

2. The computer-implemented method of claim 1, wherein the encryption and decryption is performed using calls to a DPAPI comprised by the client.

3. The computer-implemented method of claim 1, wherein the information from the client used to encrypt the modulated data signal is a session key.

4. The computer-implemented method of claim 3, wherein the session key is symmetric.

5. The computer-implemented method of claim 1, further comprising sending the encrypted modulated data signal encrypted using the information from the server to the server.

6. The computer-implemented method of claim 5, wherein the information from the server used in encrypting the decrypted modulated data signal includes an intended recipient's public key.

7. The computer-implemented method of claim 1, wherein the encrypted modulated data signal is converted to MIME format before storing on the client.

8. The computer-implemented method of claim 1, wherein the client is an embedded device operating in response to executed instructions of a mail tool application.

9. A computer-readable storage medium having stored thereon instructions that when executed by an embedded device perform operations implementing the method of claim 1.

10. A computer-readable storage medium storing instructions for securely storing unsent messages in a client, comprising:
   producing an a modulated data signal that is to be sent from the client to a server;
   using information from the client to encrypt the modulated data signal in response to a determination that a connection from the client to the server does not exist;
   storing the encrypted modulated data signal on the client; and
   using information from the client to decrypt the encrypted modulated data signal in response to a determination that a connection from the client to the server exists;
   using information from the server to encrypt the decrypted modulated data signal using for transmission to the server.

11. The computer-readable storage medium of claim 10, wherein the encryption and decryption is performed using calls to a DPAPI comprised by the client.

12. The computer-readable storage medium of claim 10, wherein the information from the client used to encrypt the modulated data signal is a session key.

13. The computer-readable storage medium of claim 10, further comprising sending the encrypted modulated data signal encrypted using the information from the server to the server.

14. The computer-readable storage medium of claim 10, wherein the encrypted modulated data signal is converted to MIME format before storing on the client.

15. A system for securely storing unsent messages in a client, the system comprising:
   a communication layer for sending bidirectional communications between the client and a server;
   an encryption layer for using information from the client to encrypt a modulated data signal that is to be sent from the client to the server in response to a determination that a connection from the client to the server does not exist;
   a local memory for storing the encrypted modulated data signal on the client; and
   a decryption layer for using information from the client to decrypt the encrypted modulated data signal into a decrypted modulated data signal in response to a determination that a connection from the client to the server exists, such that the encryption layer encrypts the decrypted modulated data signal using information from the server for transmission to the server.

16. The system of claim 15, wherein the encryption layer and decryption layer are configured to make calls to a DPAPI comprised by the client.

17. The system of claim 15, wherein the information from the client used to encrypt the modulated data signal is a session key.

18. The system of claim 15, wherein the communication layer is configured to send the encrypted modulated data signal encrypted using the information from the server to the server.

19. The system of claim 15, further comprising a formatter that is configured to convert the encrypted modulated data signal to MIME format before storing the local memory on the client.

20. The system of claim 15, wherein the client is an embedded device operating in response to executed instructions of a mail tool application.

* * * * *